United States Patent
Hofmann et al.

(10) Patent No.: US 10,060,545 B2
(45) Date of Patent: Aug. 28, 2018

(54) VALVE CLOSING DEVICE AND METHOD FOR PROVIDING A VALVE CLOSING DEVICE

(71) Applicant: AUMA Riester GmbH & Co. KG, Mullheim (DE)

(72) Inventors: Benjamin Hofmann, Heitersheim (DE); Wilfried Platzer, Freiburg (DE)

(73) Assignee: AUMA Riester GmbH & Co. KG, Müllheim (DE)

( * ) Notice: Subject to any disclaimer, the term of this patent is extended or adjusted under 35 U.S.C. 154(b) by 85 days.

(21) Appl. No.: 15/320,058

(22) PCT Filed: May 15, 2015

(86) PCT No.: PCT/EP2015/001006
§ 371 (c)(1),
(2) Date: Dec. 19, 2016

(87) PCT Pub. No.: WO2015/197151
PCT Pub. Date: Dec. 30, 2015

(65) Prior Publication Data
US 2017/0146146 A1 May 25, 2017

(30) Foreign Application Priority Data
Jun. 28, 2014 (DE) .................. 10 2014 010 042

(51) Int. Cl.
*F16K 31/04* (2006.01)
*H02J 7/34* (2006.01)
*H02P 4/00* (2006.01)
*H02J 7/00* (2006.01)

(52) U.S. Cl.
CPC .......... *F16K 31/046* (2013.01); *H02J 7/0057* (2013.01); *H02J 7/34* (2013.01); *H02P 4/00* (2013.01)

(58) Field of Classification Search
CPC .......... F16K 31/046; F16K 31/04; H02P 4/00; H02J 7/34; H02J 1/10; H02J 7/0057; H02J 9/06
USPC ............. 137/1; 251/129.01, 129.04; 320/138
See application file for complete search history.

(56) References Cited

U.S. PATENT DOCUMENTS

| | | | | |
|---|---|---|---|---|
| 5,240,022 A | * | 8/1993 | Franklin | F16K 5/0647 137/1 |
| 5,694,960 A | * | 12/1997 | Turk | A62C 2/04 137/1 |
| 5,894,222 A | | 4/1999 | Hibino | |
| 5,975,106 A | * | 11/1999 | Morgan | A62C 2/04 251/14 |

(Continued)

FOREIGN PATENT DOCUMENTS

| | | |
|---|---|---|
| DE | 3840125 | 5/1990 |
| DE | 19827478 | 1/2000 |
| EP | 0851163 | 7/1998 |

*Primary Examiner* — John Bastianelli
(74) *Attorney, Agent, or Firm* — Volpe and Koenig, P.C.

(57) ABSTRACT

In a valve closing device (4) including an emergency actuator (7, 8), the emergency actuator (7, 8) is energized by at least two independently, redundantly operable energy storage units (10, 11, 18), each of which includes charging electronics (22) that allow rechargeable batteries (19, 20) of the energy storage units (10, 11, 18) to be operated at least in a maintenance charging cycle and in a trickle charging cycle.

18 Claims, 9 Drawing Sheets

(56) References Cited

U.S. PATENT DOCUMENTS

| | | | | |
|---|---|---|---|---|
| 6,517,045 B1 * | 2/2003 | Northedge | ............ | F16K 31/082 251/129.16 |
| 6,837,271 B1 * | 1/2005 | Saint | ................... | G01M 3/2807 251/129.04 |
| 7,059,338 B1 * | 6/2006 | Kincaid | ................ | F16K 31/046 137/14 |
| 2010/0288366 A1 * | 11/2010 | Shoap | ..................... | F16L 11/12 137/1 |

* cited by examiner

VALVE CLOSING DEVICE AND METHOD FOR PROVIDING A VALVE CLOSING DEVICE

BACKGROUND

The invention relates to a fitting closing device comprising an input shaft and an output shaft, which is coupled to the input shaft, and an electrically operable emergency drive with which the output shaft can be driven outside normal operation.

Fitting closing devices of this kind are known and are used, for example, in fitting actuating arrangements in order to move the respectively connected fitting to a defined end state, for example to an open state or a closed state, in the event of a fault or any other failure in normal operation.

Here, emergency drives which are based on different technical principles are known, wherein, preferably from safety-related aspects, drive technologies of the kind which complement a drive technology of the actuating drive of the fitting actuating arrangement, which actuating drive operates during normal operation, are used.

The invention further relates to a method for keeping ready a fitting closing device, wherein the fitting closing device has an input shaft and an output shaft, which is coupled to the input shaft, and an electrically operable emergency drive with which the output shaft can be driven outside normal operation.

Depending on the drive technology used, different methods are used here in order to ensure that the emergency drive is ready to function in the event of failure or an interruption in the normal operation.

EP 0 851 163 A2 discloses an electrical actuating drive for a valve or the like, wherein an emergency drive assembly having a rechargeable battery is arranged on an electronics plate such that it can be plugged in.

DE 38 40 125 A1 discloses a slide device, wherein an emergency actuating device has, as energy store, at least one electrical rechargeable battery or at least one electrical battery.

U.S. Pat. No. 5,894,222 A discloses a battery testing method for individually testing secondary batteries by charging and discharging the batteries, wherein a common battery testing circuit is formed for both batteries.

DE 19 827 478 A1 discloses an emergency medical device with an incorporated rechargeable battery device, wherein a control device discharges the rechargeable batteries to the end-of-charge voltage one after the other in a care functioning mode, and then recharges said rechargeable batteries, wherein a full rechargeable battery is always kept ready for operation.

Furthermore, DE 38 40 125 A1 discloses an emergency actuating device which has an emergency drive device which can be operated following failure of the supply system voltage with energy which originates from at least one energy store.

SUMMARY

The invention is based on the object of providing a fitting closing device with an electrically operable emergency drive which satisfies safety-related requirements.

In order to achieve this object, one or more features of the invention are provided in a fitting closing device. According to the invention, it is therefore proposed, in particular, for a fitting closing device of the kind mentioned in the introductory part that the emergency drive is fed or can be fed from at least two energy storage units which are separate from one another and each have at least one rechargeable battery, wherein each energy storage unit has a charging electronics system in each case. It is advantageous here that a redundancy is formed, it being possible for drive energy for driving the emergency drive to still be provided in the event of failure or an interruption in normal operation even in the event of failure of an energy storage unit. The energy storage units can therefore be charged separately or independently of one another. Therefore, the fitting closing device according to the invention can also be combined with electrically operated actuating drive is, wherein strict safety-related requirements can be met owing to the redundancy.

In one refinement of the invention, it can be provided that each charging electronics system can be operated at least in a maintenance charging cycle and in a trickle charging cycle. Here, a maintenance charging cycle and a trickle charging cycle are two different types of charging cycles, which are known per se, for rechargeable batteries, that is to say for one or more combined, chargeable electrochemical cells. In this case, it is advantageous that a functional check of the connected rechargeable batteries can be carried out from time to time in a maintenance charging cycle. In this case, it is further advantageous that the rechargeable batteries can be held in a readiness state for example outside the maintenance charging cycle by the associated rechargeable battery being charged in a trickle charging cycle of the charging electronics system. Therefore, depending on requirements for the at least one connected rechargeable battery, the charging electronics system allows the type of charging cycle to be pre-specified, preferably independently of the type of charging cycle which is currently set for the other rechargeable batteries.

In one refinement of the invention, it can be provided that at least one energy storage unit has more than one rechargeable battery and the associated charging electronics system is designed such that one rechargeable battery can be operated in the maintenance charging cycle and a further rechargeable battery can be operated in the trickle charging cycle at the same time. Therefore, it is easy to achieve the situation that at least one rechargeable battery of the energy storage unit is available even when parts of the energy storage unit are subject to maintenance. As a result, the safety level can be increased since the energy storage unit remains ready for use even during partial maintenance.

In one refinement of the invention, it can be provided that at least one energy storage unit, for example the abovementioned energy storage unit, has more than one rechargeable battery and the associated charging electronics system is designed such that at most one rechargeable battery can be operated or is operated in the maintenance charging cycle at any time. In this case, it is advantageous that overloading of a supply system can be avoided by it being possible to avoid operator control states in which two rechargeable batteries draw comparatively high charge currents in the maintenance charging cycle.

In one refinement of the invention, it can be provided that at least one energy storage unit, for example the abovementioned energy storage unit, has more than one rechargeable battery, and the associated charging electronics system is designed to successively carry out maintenance charging cycles on the rechargeable batteries of the energy storage unit. Therefore, the rechargeable batteries of an energy storage unit can be periodically checked at regular intervals. To this end, a timing device or timer which initiates a change in the types of charging cycle after a pre-specified sequence can be formed for example.

In one refinement of the invention, it can be provided that a charging electronics system of one energy storage unit is coupled to a charging electronics system of a further energy storage unit by means of a signal and/or control connection in such a way that a rechargeable battery cannot be operated in the maintenance charging cycle in both energy storage units simultaneously. In this case, it is advantageous that high total charge currents can be avoided.

In one refinement of the invention, it can be provided that an arbitration device is designed to generate a blocking signal when a rechargeable battery is operated in the maintenance charging cycle. Arbitration devices are known per se, for example for resolving conflicts or collisions in communication subscribers. In this case, it is advantageous that it is possible to prevent two rechargeable batteries from being simultaneously operated in the maintenance charging cycle in a simple manner. In this case, the arbitration device can be designed as part of the mentioned signal and/or control connection.

In one refinement of the invention, it can be provided that an arbitration device, for example the abovementioned arbitration device, is designed to generate an enable signal when no rechargeable battery is operated in the maintenance charging cycle. In this case, it is advantageous that it is possible to identify for the charging electronics systems in a simple manner whether a changeover to the maintenance charging cycle for a rechargeable battery is currently possible.

In general, it can be provided that each charging electronics system is designed to make an enable request to an arbitration device, for example the abovementioned arbitration device, before an associated rechargeable battery changes over to the maintenance charging cycle. Therefore, it is possible to avoid a rechargeable battery changing over to the maintenance charging cycle if another rechargeable battery is already being operated in the maintenance charging cycle in a simple manner. Here, the charging electronics system can be designed to generate and/or transmit an enable request and/or to evaluate a response to the enable request, for example in the form of an enable signal.

In one refinement of the invention, it can be provided that a blocking diode is arranged at a supply output of each energy storage unit. Each blocking diode is preferably arranged with a blocking direction such that charging of the energy storage unit by means of the supply output is prevented. Therefore, a plurality of energy storage units can be brought together by way of their supply outputs, without one energy storage unit being able to discharge into another energy storage unit. This makes the redundant provision of energy storage units for supplying power to an emergency drive possible in a simple manner.

In one refinement of the invention, it can be provided that at least one energy storage unit has more than one rechargeable battery, and in each case one blocking diode is arranged at a rechargeable battery output of each associated rechargeable battery. The blocking period is preferably in each case arranged with a blocking direction such that charging of the associated rechargeable battery by means of the blocking diode is prevented. In this case, it is advantageous that discharging of a rechargeable battery into a further rechargeable battery of the same energy storage unit by means of the associated rechargeable battery output of the further rechargeable battery is prevented. Therefore, the rechargeable batteries of an energy storage unit can be connected in a simple manner by way of their rechargeable battery outputs to a supply output of the energy storage unit.

In one refinement of the invention, it can be provided that each rechargeable battery can be selectively electrically connected to a discharge connection, to a trickle charge connection and to a maintenance charge connection. Here, the discharge connection is connected or can be connected to the mentioned supply output. Here, the electrical connection can be established by relays or semiconductor switches or other switching means. In this case, it is advantageous that the rechargeable batteries can be switched to supply the above-mentioned emergency drive and can be operated in a trickle charging cycle and in a maintenance charging cycle during operation.

A preferred application of the invention is the case of a fitting actuating arrangement which has an actuating drive and a fitting closing device according to the invention, in particular as described above and/or as claimed in one of the claims which are directed at a fitting closing device, wherein the input shaft can be driven by the actuating drive during normal operation.

In order to achieve this object, the invention provides, in the case of a method of the kind described in the introductory part, that the emergency drive can be fed and/or is fed from at least two energy storage units which are separate from one another, that the energy storage units each have at least one rechargeable battery, and that at least one rechargeable battery is operated in a trickle charging cycle while a further rechargeable battery is operated in a maintenance charging cycle. In this case, it is advantageous that the fitting closing device can be kept ready even when a rechargeable battery is operated in a maintenance charging cycle for functional checking or for other purposes. In this way, it is possible to increase the availability of the emergency drive, as a result of which a safety-oriented function of the electrically operable emergency drive can be realized.

In one refinement of the invention, it can be provided that, when a rechargeable battery is operated in the maintenance charging cycle, operation in the maintenance charging cycle is electronically blocked for all further rechargeable batteries of the associated energy storage unit. In this case, it is advantageous that an excessively high charge current, which has been created by simultaneously executing maintenance charging cycles for two rechargeable batteries of an energy storage unit can be avoided. As an alternative or in addition, it can be provided that, when a rechargeable battery is operated in the maintenance charging cycle, operation in the maintenance charging cycle is electronically blocked for all further rechargeable batteries of the fitting closing device. Therefore, the maximum charge current for the fitting closing device as a whole can be limited.

In one refinement of the invention, it can be provided that, before a rechargeable battery changes over to the maintenance charging cycle, a check is made in an arbitration method to determine whether a further rechargeable battery is currently being operated in the maintenance charging cycle. An arbitration method provides a simple way of avoiding the simultaneous changeover of two or more rechargeable batteries to the respective maintenance charging cycle. By way of example, the above-described arbitration device can be used here.

In one refinement of the invention, it can be provided that, before a rechargeable battery is operated in the maintenance charging cycle, an enable signal is awaited. As an alternative or in addition, an end of a blocking signal can be awaited. In this case, it is advantageous that a changeover of a rechargeable battery to the maintenance charging cycle can be prevented provided that at least one further rechargeable battery is operated in the maintenance charging cycle.

Therefore, high currents due to simultaneously executed maintenance charging cycles can be avoided.

In one refinement of the invention, it can be provided that a blocking signal, for example the abovementioned blocking signal, is generated when a rechargeable battery is operated in the maintenance charging cycle. In this case, it is advantageous that it is possible to signal for all charging devices that a changeover to the maintenance charging cycle is currently blocked.

Here, the enable signal and/or the blocking signal can be generated, for example, by an arbitration device and/or the respective charging electronics systems themselves.

In one refinement of the invention, it can be provided that the rechargeable batteries of an energy storage unit are successively operated in the maintenance charging cycle. In this case, it is advantageous that a regular functional check can be carried out for all rechargeable batteries of the energy storage unit.

Here, a timing device or a timer can in each case initiate a change in the type of charging cycle.

In general, it can be provided that a capacitance of the respective rechargeable battery is measured in the maintenance charging cycle. This measurement is measured, for example, by measurement of the charge current and/or measurement of the time period until a fully charged state is reached. More precise results can be achieved when the capacitance is/are measured by measuring the discharge current and/or measuring the time period until a fully charged state is reached, in each case starting from a known state of charge or a fully charged state.

In one refinement of the invention, it can be provided that a rechargeable battery is discharged in the maintenance charging cycle. It is particularly expedient when the discharge is a complete discharge. In this case, it is advantageous that a defined initial state for charging the rechargeable battery is provided in order to check the functionality of said rechargeable battery.

It can be provided that a fault signal is output when a measured capacitance, for example the abovementioned capacitance of a rechargeable battery, for example of the abovementioned rechargeable battery, lies below a threshold value. In this case, it is advantageous that a functional check can be carried out in a simple manner.

It is particularly expedient when the method according to the invention is executed with a fitting closing device according to the invention, in particular as described above and/or as claimed in one of the claims which is directed at a fitting closing device. It is also expedient when the fitting closing device according to the invention are designed means for executing a method according to the invention, in particular as described above and/or as claimed in one of the claims which is directed at a fitting closing device.

BRIEF DESCRIPTION OF THE DRAWINGS

The invention will now be described in greater detail with reference to exemplary embodiments, but is not limited to these exemplary embodiments. Further exemplary embodiments can be produced by combining the features of individual or several claims with one another and/or with individual or several features of the exemplary embodiments.

In the drawings.

DETAILED DESCRIPTION OF THE PREFERRED EMBODIMENTS

Figure 1:
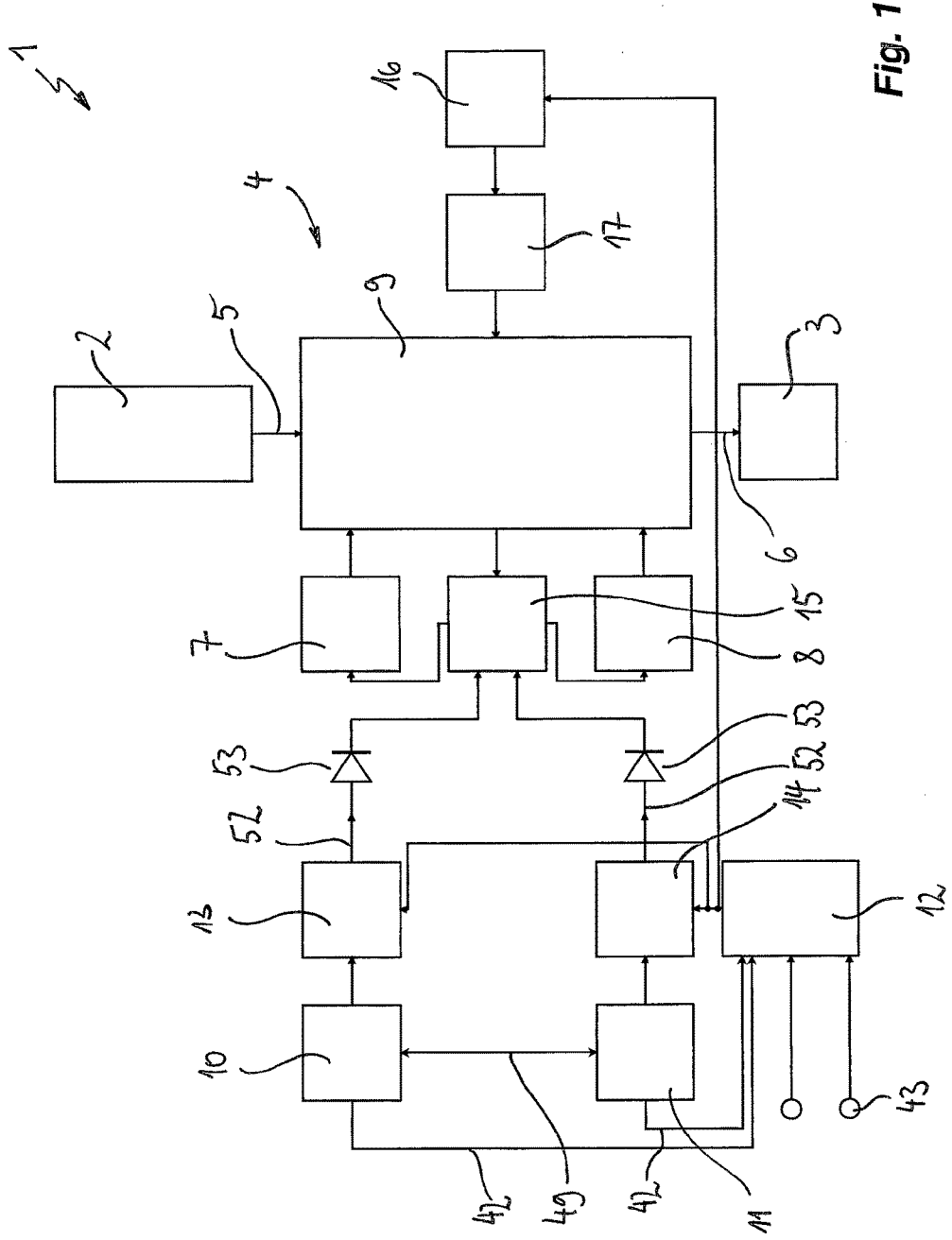
FIG. 1 shows a fitting closing device according to the invention in a fitting actuating arrangement, wherein the fitting closing device has two separate emergency drives.

FIG. 1 shows a highly simplified block diagram of a fitting actuating arrangement, denoted 1 overall, for explaining the principle of the invention. The fitting actuating arrangement 1 has an actuating drive 2 in a manner which is known per se. The actuating drive 2 can be operated electrically, hydraulically, pneumatically or in some other way. Electrical operation, in which the actuating drive 2 is supplied from a supply system 91 (cf. FIGS. 6 to 8) is preferred.

The actuating drive 2 according to FIG. 1 serves to operate a fitting 3, which can be a valve for example.

A fitting closing device 4 according to the invention is arranged between the actuating drive 2 and the fitting 3.

The fitting closing device 4 serves to operate, for example to close or open, the fitting 3 in the event of an operational fault or failure in the supply system.

To this end, the fitting closing device 4 is provided with an input shaft 5 and an output shaft 6, which shafts are coupled to one another, so that a flow of force can be transmitted from the input shaft 5 to the output shaft 6.

The input shaft 5 is driven by the actuating drive 2. This prevents the actuating drive 2 from being able to be driven by means of the input shaft 5, for example by a self-locking gear mechanism, which is known per se but not illustrated any further, or by a brake or in some other way.

The output shaft 6 is operatively connected to the fitting 3 for operation purposes.

The fitting closing device 4 has an emergency drive 7 with which the output shaft 6 can be operated or can be driven in order to move the output shaft 6 from the use position to a defined end position, for example a closed or an open fitting 3, in a dangerous situation in the event of failure of the actuating drive 2.

To this end, a superposition gear mechanism 9, not illustrated any further, is arranged between the input shaft 5 and the output shaft 6 in a manner which is known per se, the emergency drive 7 being coupled to the output shaft by means of said superposition gear mechanism.

A second emergency drive 8, which operates in parallel with the emergency drive 7, is provided in order to provide a redundancy and in order to increase a safety level of the fitting closing device 4.

The emergency drives 7, 8 can be fed and are fed during operation from a first energy storage unit 10 and a second energy storage unit 11.

Here, the second energy storage unit 11 is formed separately from the first energy storage unit 10 and can be operated independently of said first energy storage unit in order to create a redundancy.

A driving electronics system 12 which is known per se is designed to operate switch-on devices 13, 14 with which the two energy storage units 10, 11 which are separate from one another can be switched on in order to supply the emergency drives 7, 8.

An end position switching device 15 is driven and operated by the superposition gear mechanism 9 or the output shaft 6 when the desired end position is reached, in order to interrupt feeding of the emergency drives 7, 8 from the energy storage units 10, 11.

The switch-on devices 13, 14 and/or the end position switching device 15 can be formed, for example, as electromagnetic switches and/or with semiconductor elements.

It is expedient to design the end position switching device 15 as an opener.

The driving electronics system 12 drives a brake switch-off electronics system 16, with which a holding brake 17 can be operated, for example can be vented or can be closed, in a manner which is known per se.

Figure 2:
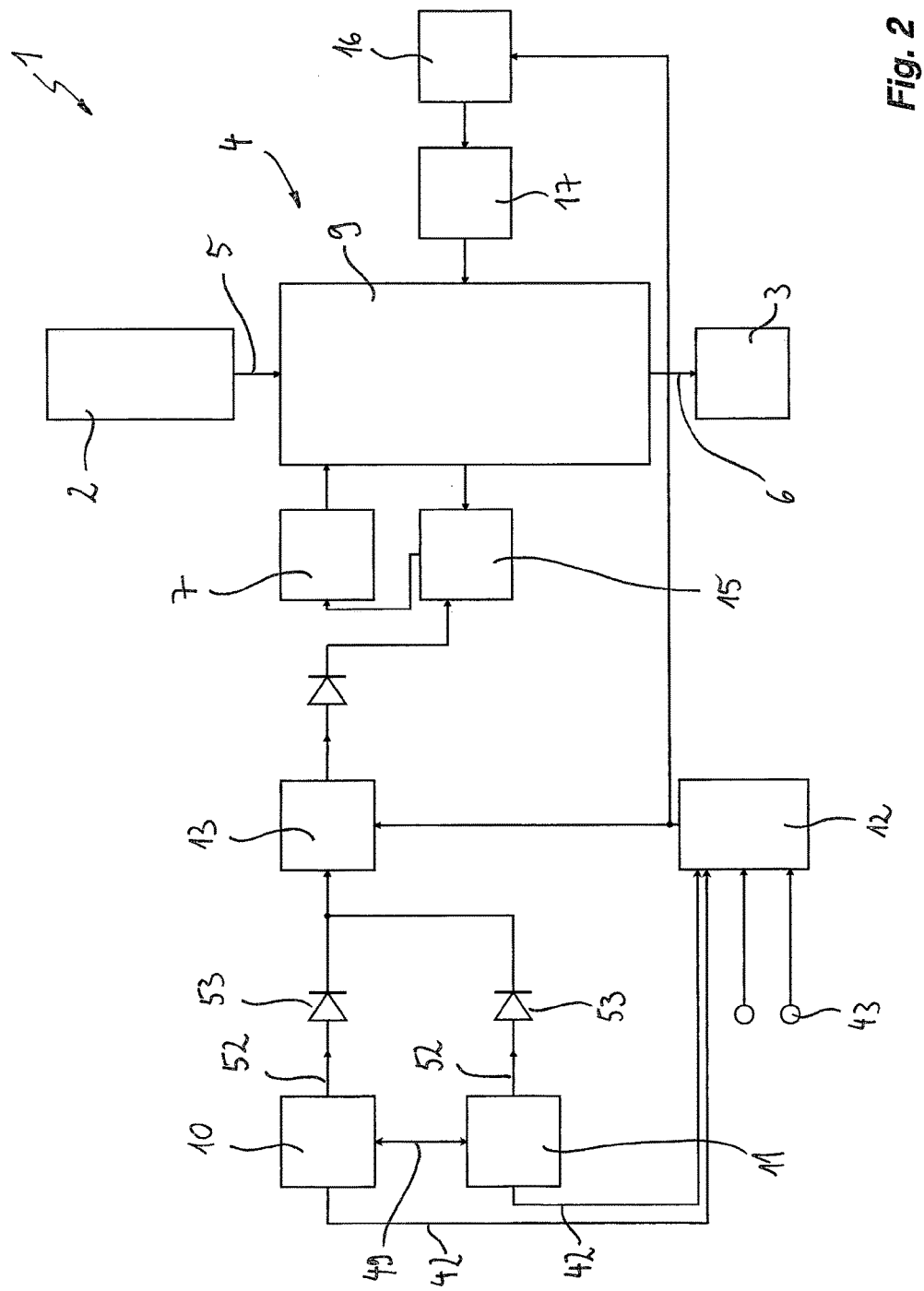
FIG. 2 shows a further fitting actuating arrangement comprising a further fitting closing device according to the invention with one emergency drive.

FIG. 2 shows a further exemplary embodiment according to the invention with a fitting actuating arrangement 1 and a fitting closing device 4 according to the invention. Assemblies and functional units which are similar or identical in terms of design and/or function to the exemplary embodiment according to FIG. 1 are denoted by the same reference symbols and are not separately described again. The statements made in respect of FIG. 1 therefore accordingly apply to FIG. 2.

The exemplary embodiment according to FIG. 2 firstly differs from the exemplary embodiment according to FIG. 1 in that only one emergency drive 7 is formed.

The exemplary embodiment according to FIG. 2 further differs from the exemplary embodiment according to FIG. 1 in that the two energy storage units 10, 11 which are separate from one another are brought together at a switch-on device 13. Therefore, feeding of the emergency drive 7 for the two energy storage units 10, 11 can be switched on by way of a switching process of the switch-on device 13 and can be switched off by way of a switching process of the end position switching device 15.

Figure 3:
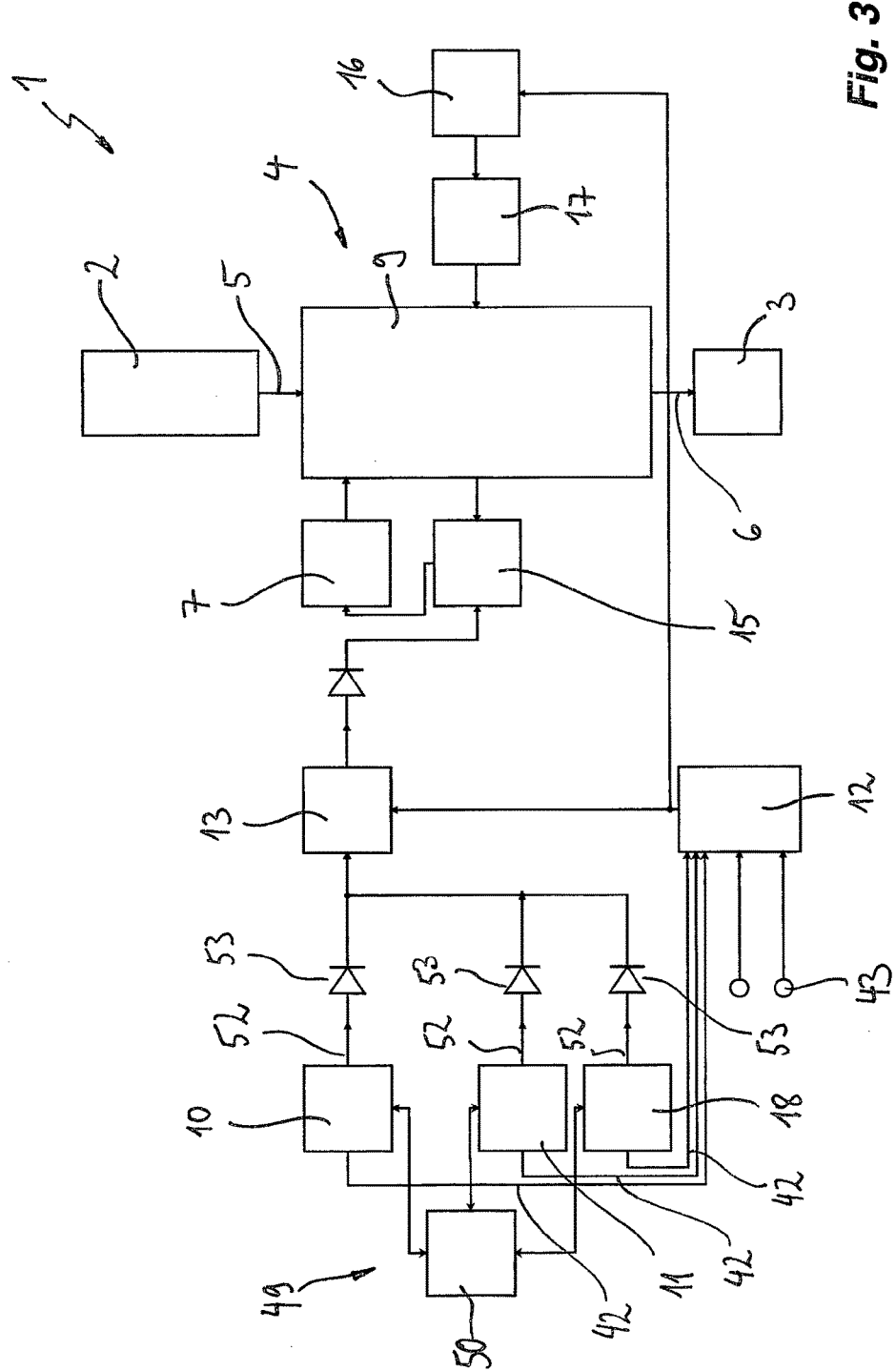
FIG. 3 shows a further fitting actuating arrangement comprising a further fitting closing device according to the invention with an arbitration device.

FIG. 3 shows a further exemplary embodiment of a fitting closing device 4 according to the invention. Components and functional units which are similar or identical in terms of function and/or design to the preceding exemplary embodiments according to FIG. 1 or FIG. 2 are again denoted by the same reference symbols and are not separately described again. The statements made in respect of FIG. 1 and FIG. 2 therefore accordingly apply to FIG. 3.

The exemplary embodiment according to FIG. 3 differs from the preceding exemplary embodiments in that a third energy storage unit 18 is formed, from which the emergency drive 7 can be fed and is fed after appropriate connection of the switch-on device 13 and the end position switching device 15. More than three energy storage units are formed in further exemplary embodiments.

The three energy storage units 10, 11 and 18 which are formed separately from one another are brought together at the switch-on device 13.

Figure 6:
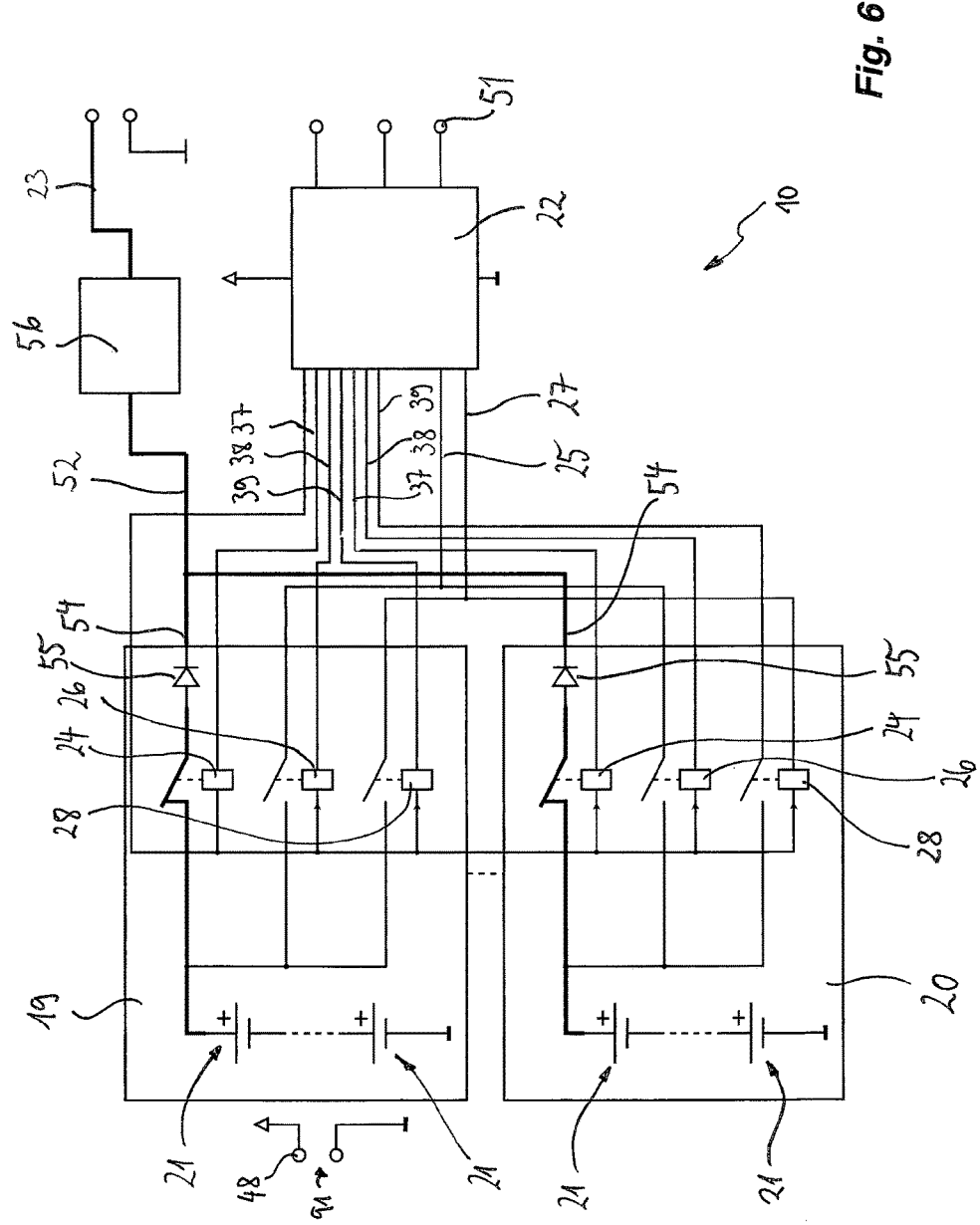
FIG. 6 shows a switching state of an energy storage unit of a fitting closing device according to the invention.

Each of the energy storage units 10, 11, 18 in FIGS. 1 to 3 is constructed internally according to FIG. 6. FIG. 6 shows this construction for the energy storage unit 10 by way of example.

The energy storage unit 10—and analogously the energy storage units 11, 18—has a first rechargeable battery 19 and a second rechargeable battery 20. In order to simplify the illustration, only two rechargeable batteries 19, 20 are illustrated in FIG. 6. However, in further exemplary embodiments, more than two, for example three, four, five or more than five, rechargeable batteries can be formed in each energy storage unit 10, 11, 18.

The rechargeable batteries 19, 20 are each formed from at least one electrochemical cell 21 in order to achieve, for example, a desired supply voltage and/or a desired charging capacitance. It is often the case that there are so many electrochemical cells 21 that a desired power can be provided.

Figure 4:
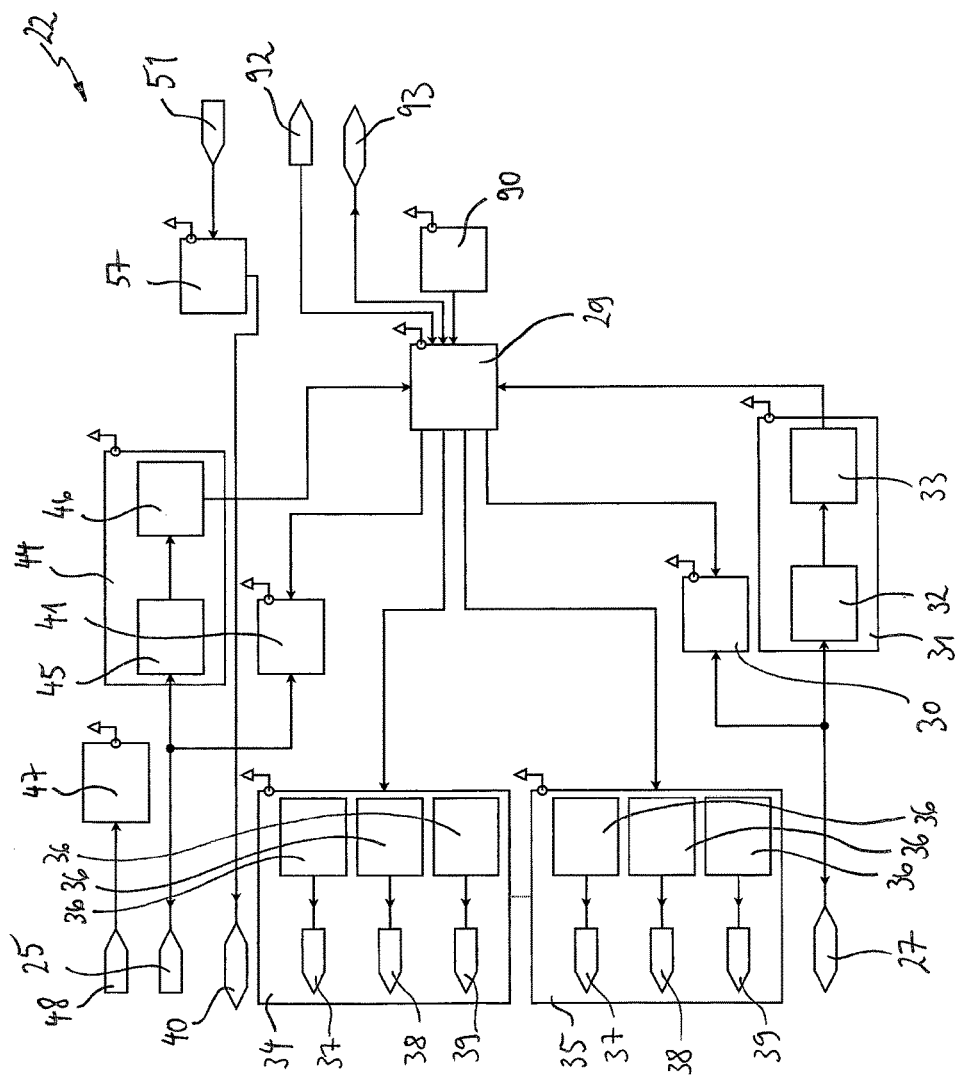
FIG. 4 shows a charging electronics system of a fitting closing device according to the invention.

Each energy storage unit 10, 11, 18 further has a charging electronics system 22 which is shown in schematic form in FIG. 4 by way of example. The rechargeable batteries 19, 20 are each equipped with or connected to a discharge connection 23 at the supply output 52, it being possible for the emergency drive 7 and possibly the emergency drive 8 to be supplied by means of said discharge connection.

To this end, the discharge connection 23 can be connected to the rechargeable battery 19, and in particular to the electrochemical cells 21 of said rechargeable battery, by way of a switching unit 24.

A maintenance charge connection 25 is formed at the charging electronics system 22 for each rechargeable battery 19, 20, it being possible for said maintenance charge connection to be electrically connected to the individual rechargeable batteries 19, 20, and in particular to the electrochemical cells 21 of said individual rechargeable batteries, by means of a respective maintenance charging switching unit 26.

The charging electronics system 22 further has a trickle charge connection 27 which can be electrically connected to the respective rechargeable battery 19, 20, and in particular to the electrochemical cells 21 of said rechargeable battery, by means of respective trickle charging switching units 28.

It is clear from the view of a detail according to FIG. 4 that the charging electronics system 22 has a computer unit 29 which is designed to drive or activate charging cycles for the rechargeable batteries 19, 20.

The charging electronics system 22 has a trickle charging circuit 30 with which a trickle charging cycle can be operated.

The trickle charging voltage which is generated by the trickle charging circuit 30 is applied to the trickle discharge connection.

The measuring device 31 can measure the battery voltage during the trickle charging cycle and can be used to control the trickle charging voltage. To this end, the measuring device 31 has a measurement level adjustment means 32 and an analog/digital conversion means 33. The measurement signal is returned to the computer unit 29.

The charging electronics system 22 drives a switch driving means 34, 35—a relay driving means in the example here—separately for each rechargeable battery 19, 20.

The switch driving means 34 is therefore provided for driving the switching unit 24, the maintenance charging switching unit 26 and the trickle charging switching unit 28 of the rechargeable battery 19, while the switch driving means 35 is provided for driving the switching unit 24, the maintenance charging switching unit 26 and the trickle charging switching unit 28 of the rechargeable battery 19, 20.

The switching driving means 34, 35 have corresponding drivers 36 for driving the respective switching unit 24, 26, 28. The contacts 37 are routed to the switching units 24 of the respective rechargeable battery 19, 29. The contacts 38 are routed to the respective maintenance charging switching unit 26 of the respective rechargeable battery 19 or 20. The contacts 39 are routed to the trickle charging switching unit 28 of the respective rechargeable battery 19, 20.

The switching signals of the contacts 37, 38, 39 are returned to the charging electronics system 22 by means of a return 40 as a common potential.

Therefore, when the contacts 39 are operated, the voltage is applied to the electrochemical cells 21 of the respective rechargeable battery from the trickle charging connection 27. Therefore, a trickle charging cycle for the respective rechargeable battery 19, 20 is executed.

The charging electronics system 22 further has a discharging/charging circuit 41 with which a maintenance charging cycle can be carried out.

To this end, rechargeable batteries 19, 20 which are connected to the maintenance charging connection 25 are initially fully charged, in order to then be discharged again. The charging capacitance of the connected rechargeable battery 19, 20, which charging capacitance is ascertained in this discharging process, is compared with a threshold value. If the measured capacitance of the connected rechargeable battery 19, 20 lies below this threshold value, the computer unit 29 generates a fault signal. This fault signal is fed back to the driving electronics system 12 by means of a respective feedback line 42.

In response, the driving electronics system 12 outputs an item of fault information by means of an output 43.

The respective rechargeable battery 19, 20 can therefore be operated in a maintenance charging cycle by driving the driver 36 to the contacts 38.

Power supply to the emergency drives 7, 8 from the energy storage units 10, 11, 18 can be released by driving the driver 36 to the contacts 37.

The charging electronics system 22 and, in particular, the computer unit 29 are therefore designed to operate the energy storage units 10, 11, 18 independently of one another in the maintenance charging cycle, in the trickle charging cycle or in order to supply power to the emergency drives 7, 8.

The switch driving means 34, 35 are equipped with switch monitoring means, here relay monitoring means, which are known per se, in order to monitor the functioning of the drivers 36.

It is clear from the drawing that the computer unit 29 can be driven such that, for example, the rechargeable battery 19 can be operated in a maintenance charging cycle by operating the maintenance charging switching unit 26 while the rechargeable battery 20 is simultaneously operated in the trickle charging cycle by operating the trickle charging switching unit 28.

Here, the computer unit 29 coordinates the switching states in such a way that simultaneous operation of each of the rechargeable batteries 19 and 20 in the maintenance charging cycle is blocked.

A measuring device 44, with which a rechargeable battery voltage of the respective rechargeable battery 19, 20 can be measured, is provided for monitoring the maintenance charging cycle. The measuring device 44 has, in a manner which is known per se, a measurement level adjustment means 45 and an analog/digital conversion means 46. Measurement signals from the measuring device 44 are routed to the computer unit 29 for further processing and in particular for controlling the maintenance charging cycle.

The illustrated blocks of the charging electronics system 22 are fed by a voltage stabilization means 47 which is supplied with power from a supply voltage connection 47.

The computer unit 29 is designed such that the contacts 38 to the individual rechargeable batteries 19, 20 are activated one after the other in order to successively operate these rechargeable batteries 19, 20 in maintenance charging cycles.

In order to prevent one rechargeable battery 19, 20 in one energy storage unit 10 and another rechargeable battery 19, 20 in a further energy storage unit 11, 18 from being simultaneously operated in the maintenance charging cycle, a signal and/or control connection 49 which correspondingly couples the respective charging electronics systems 20 to one another is provided.

In the exemplary embodiment according to FIG. 3, this signal and/or control connection 49 has an arbitration device 50. Here, the charging electronics systems 22 of the respective energy storage unit 10, 11, 18 send enable signals to the arbitration device 50 when a rechargeable battery 19, 20 in the energy storage unit 10, 11, 18 in question has ended the maintenance charging cycle. The charging electronics systems 22 also generate a blocking signal and transmit this blocking signal to the arbitration device 50 when a connected rechargeable battery 19, 20 of the respective energy storage unit 10, 11, 18 enters the maintenance charging cycle or is operated in the maintenance charging cycle.

The charging electronics systems 22 of the energy storage units 10, 11, 18 therefore send an enable request to the arbitration device 50 before they move a rechargeable battery 19, 20 to the maintenance charging cycle. Therefore, the changeover to the maintenance charging cycle only takes place when an enable signal is detected and, respectively, the enable request is confirmed and, respectively, the blocking signal is ended.

When an emergency-off signal (ESD signal 94) is applied to an emergency-off input 51, the computer unit 29 drives the switching units 24 by means of the respective drivers 36 and the contacts 37 in order to enable power to be supplied from the rechargeable batteries 19, 20 for all available energy storage units 10, 11, 18.

In order to prevent an energy storage unit 10, 11, 18 from charging another energy storage unit 10, 11, 18 here, a blocking diode 53 is arranged at the respective supply output 52.

As an alternative, the blocking diodes 53 can be integrated into the respective energy storage unit 10, 11, 18 in the exemplary embodiments.

In addition, a blocking diode 55 is arranged at each rechargeable battery output 54 of each rechargeable battery 19, 20 in order to prevent a rechargeable battery 19 from being charged by another rechargeable battery 20, in particular in the case of enabling switching units 24.

Figure 7:
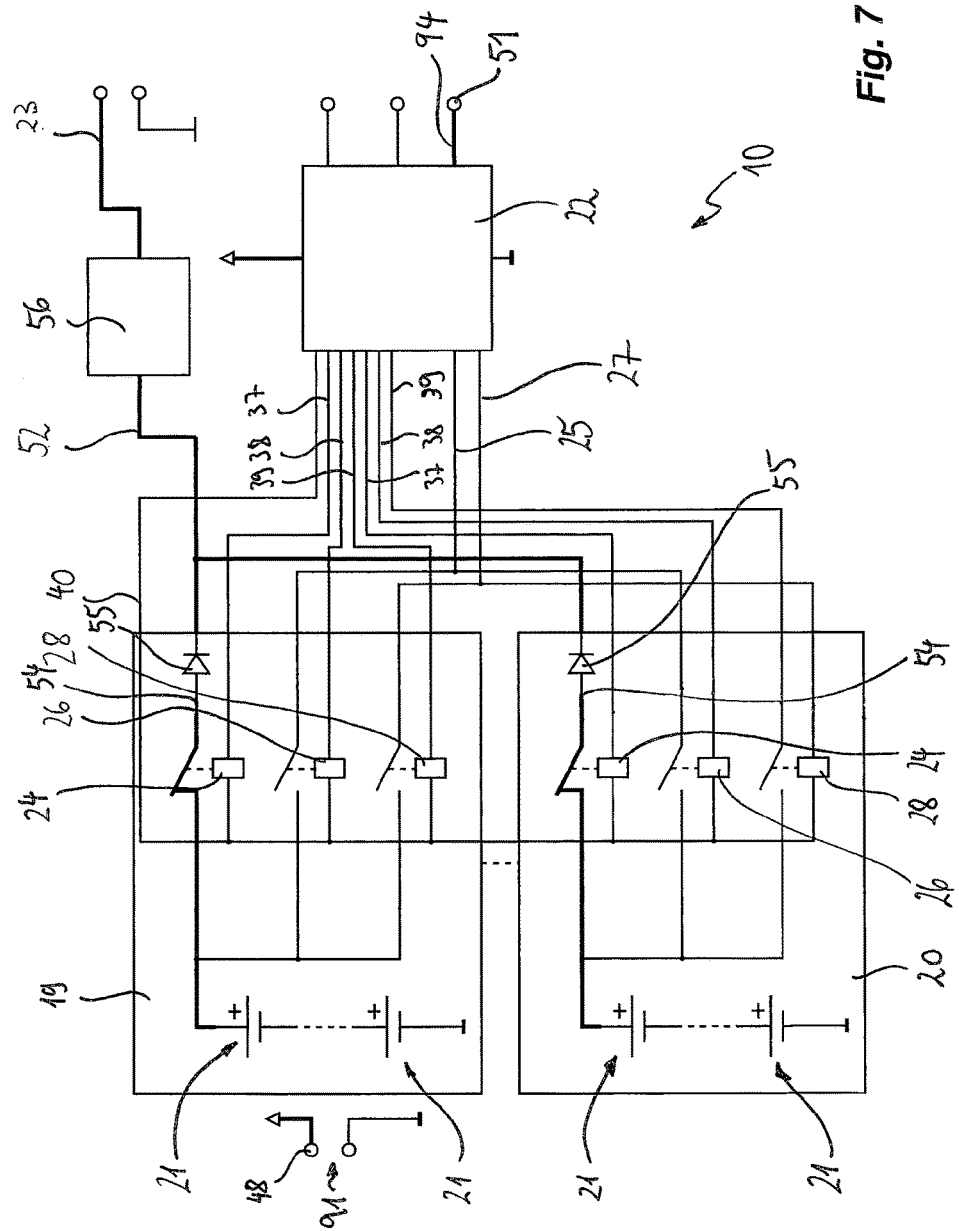
FIG. 7 shows a further switching state of an energy storage unit according to FIG. 6.
Figure 8:
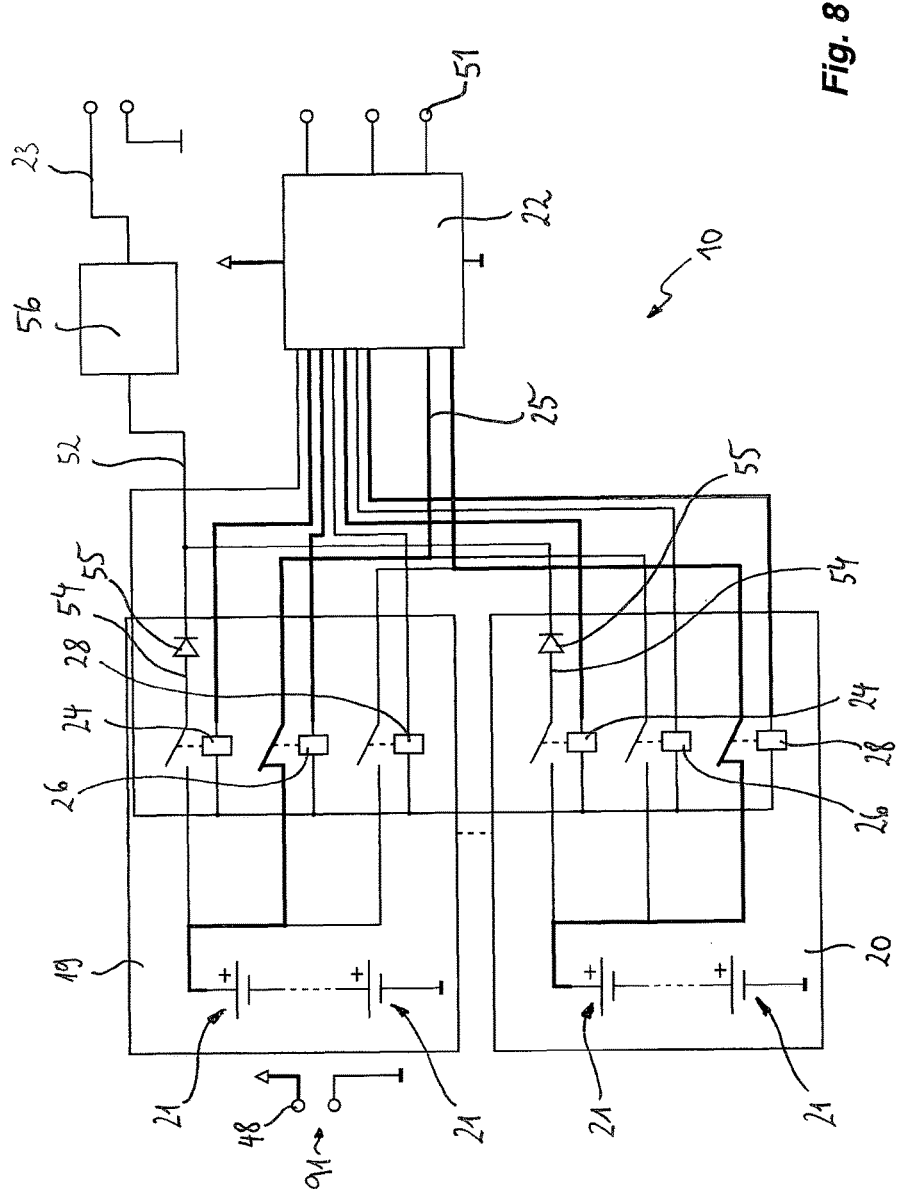
FIG. 8 shows a third switching state of an energy storage unit of a fitting closing device according to the invention.

FIGS. 6 to 8 show different switching states of the switching units 24, 26, 28, as a result of which different operating states of the respective rechargeable batteries 19, 20 can be set.

The energy storage unit 10 is illustrated in FIGS. 6 to 8, but the description accordingly applies for the energy storage units 11, 18 and further energy storage units.

Figure 5:
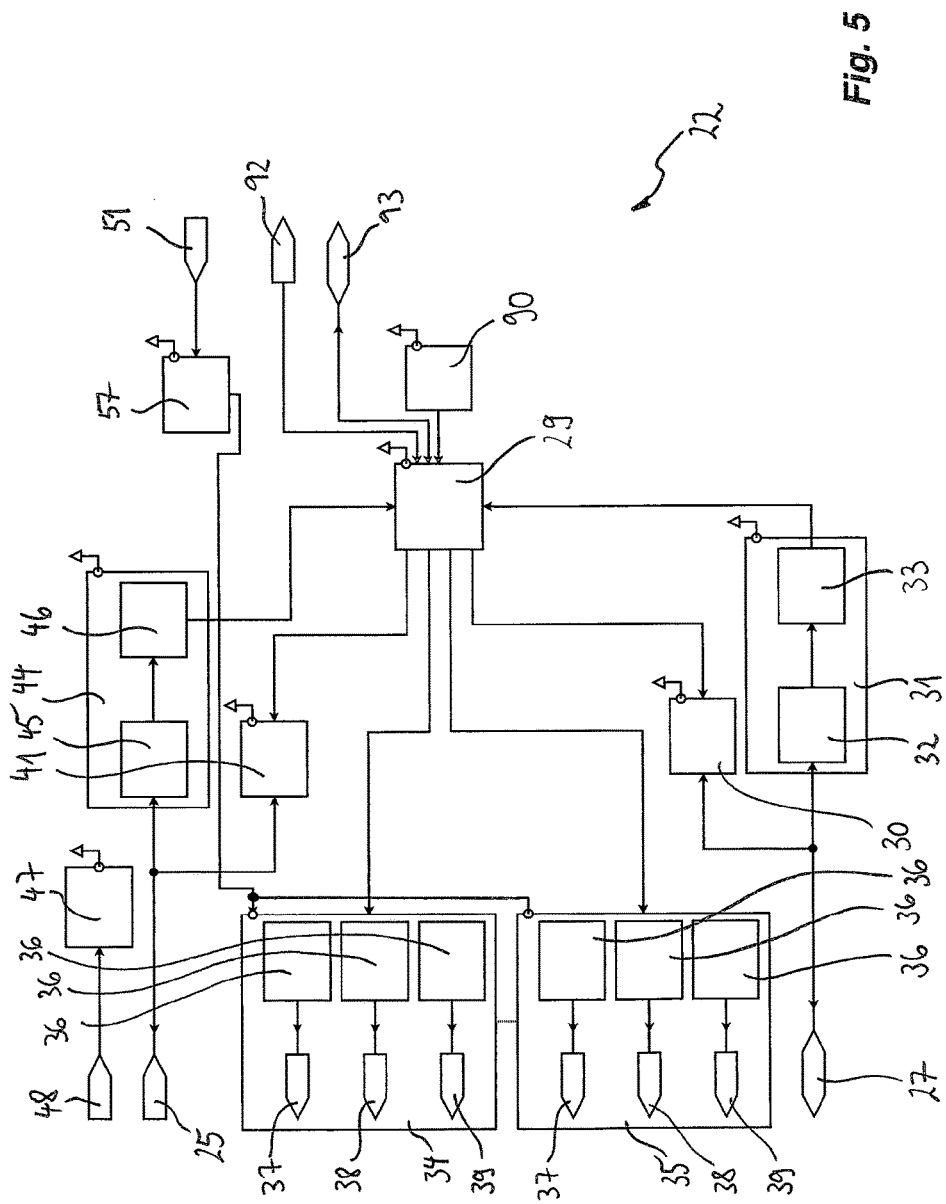
FIG. 5 shows a further charging electronics system of a fitting closing device according to the invention.

FIG. 5 shows a further charging electronics system 22 which can be used in the exemplary embodiments according to FIG. 1 to FIG. 3 instead of the charging electronics system according to FIG. 4. Components and functional units which are similar or identical in terms of function and/or design to the charging electronics system 22 according to FIG. 4 are denoted by the same reference symbols and are not separately described again.

The charging electronics system 22 according to FIG. 5 differs from the charging electronics system 22 according to FIG. 4 at least in that the driving is performed by means of drivers 36 which are formed and designed to drive semiconductor switches as switching units 24, 26 and, respectively, 28, while the drivers 3b drive relays in FIG. 4. Therefore, a return 40 can be dispensed with in this charging electronics system 22 according to FIG. 5.

A status signal output 92 by means of which status signals can be output is formed in the charging electronics systems 22 according to FIG. 4 and FIG. 5. A feedback line 42 is connected to this status signal output 92 in each case.

Furthermore, an enable and/or blocking output 93 is formed at the computer unit 29 to which, for example, the signal and/or control connection 49 is connected. Therefore, enable signals or blocking signals or enable requests can be output by means of the enable and/or blocking output 93. Here, the signal and/or control connection 49 can be formed and designed as a bus connection or else as a handshake line.

FIG. 6 shows the situation in which the charging electronics system 22 drives the switching units 24 such that the electrochemical cells 21 are connected through to the respective rechargeable battery outputs 54. Here, the supply system 91 has zero voltage, for example due to a failure of the supply system voltage.

This is the case, for example, when a fault has occurred.

In this case, the voltage across the rechargeable battery outputs 54 is used to supply power to the emergency drives 7, 8 or only to the emergency drive 7 in the exemplary embodiments according to FIG. 2 and FIG. 3. Here, a voltage control means 56 can optionally be interposed in order to achieve a desired level value.

It is clear from FIG. 6 that the charging electronics system 22 is designed such that, in this case, the maintenance charging switching units 26 and the trickle charging switching units 28 are open in order to prevent charging of the rechargeable batteries 19, 20.

FIG. 7 shows the switching situation analogously to FIG. 6 with an existing supply system voltage across the supply voltage connection 48, but with an active ESD signal 94.

FIG. 8 shows, by way of example, a switching state with an existing supply system voltage across the supply voltage connection 48, with the rechargeable battery 19 being operated in the maintenance charging cycle and the rechargeable battery 20 being operated in the trickle charging cycle.

Figure 9:
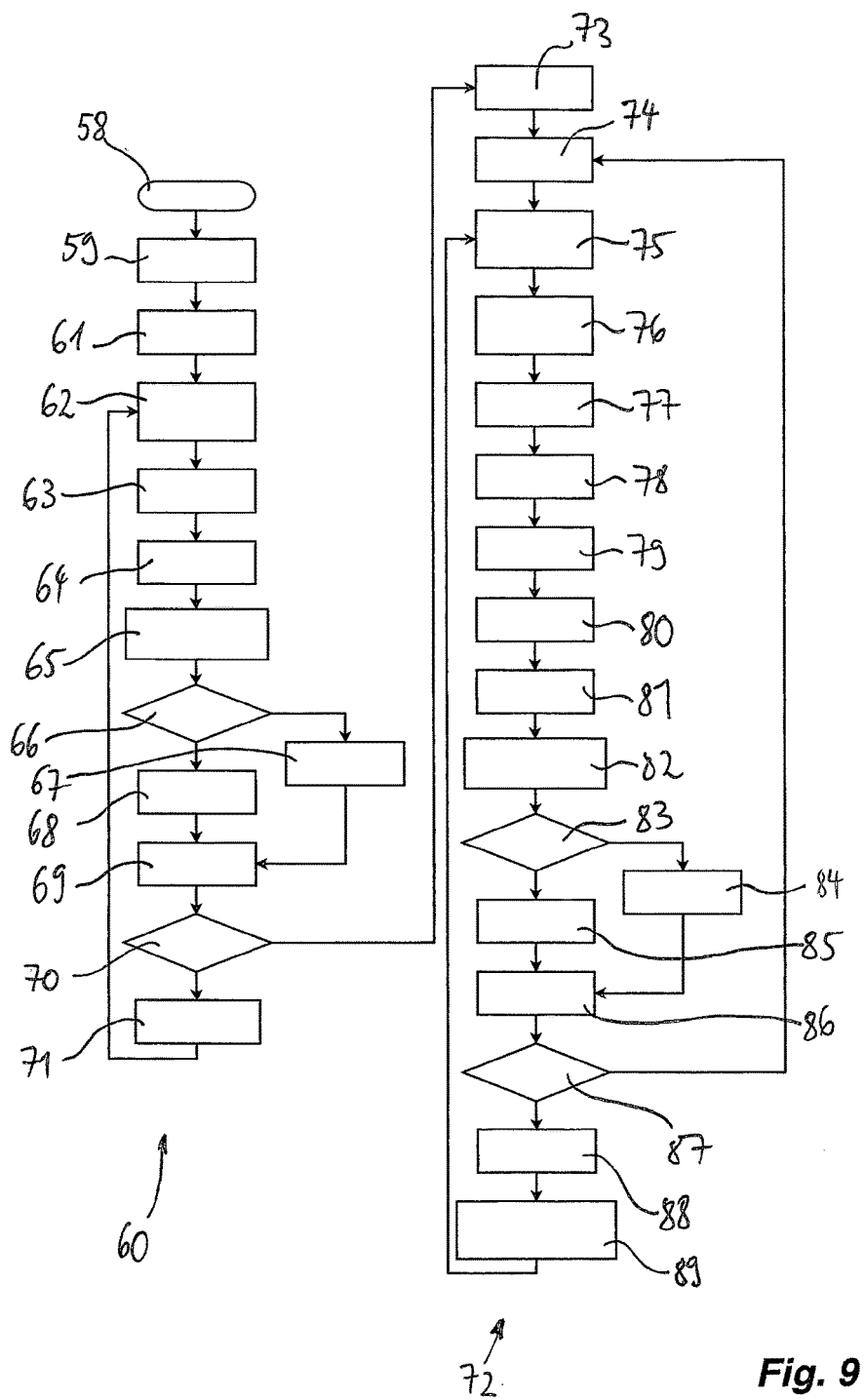
FIG. 9 shows a flowchart of a method according to the invention.

The following method runs as a program in the computer unit 29 during operation, cf. FIG. 9. A timing device 90 causes the program to proceed by, for example, the individual steps being initiated and/or by a clock being generated.

In the event of switch on, an emergency-off circuit 57 generates a reset 58 of the program. This can be generated or triggered, for example, in the event of switch on.

Initialization 59 is then performed. The individual rechargeable batteries 19, 20 of the energy storage units 10, 11, 18 are now charged one after the other, that is to say successively, in a charging method 60.

To this end, a counter is initially set to a number of the first rechargeable battery 19, 20 in a step 61. Then, the associated rechargeable battery 19, 20 relating to the current rechargeable battery number is selected for maintenance charging.

In a next step 63, a blocking signal is generated in order to indicate that the selected rechargeable battery 19, 20 is being operated in the maintenance charging cycle. This blocking signal is associated with the respective rechargeable battery 19, 20 and can contain, for example, the number of the respective rechargeable battery 19, 20.

The respective rechargeable battery 19, 20 is charged in a charging step 64.

This rechargeable battery 19, 20 is then discharged in a discharge step 65, with the capacitance of the rechargeable battery 19, 20 being measured. This is performed, for example, by means of measuring voltage profiles using the measuring device 44 or by means of integration of received charges.

In a monitoring step 66, the situation of whether the measured capacitance lies below a threshold value is monitored.

If this is the case, the rechargeable battery 19, 20 is identified as defective, and an output operation 67 of a fault signal, which is associated with the respective rechargeable battery 19, 20, is triggered. The association can be provided, for example, by output, preferably by means of a bus, of a rechargeable battery number or by using an individually associated line.

If the measured capacitance lies above the threshold value, the associated rechargeable battery 19, 20 is identified as being functional, and proper functioning of the rechargeable battery 19, 20 is confirmed in a confirmation operation 68.

In a further charging step 69, the rechargeable battery 19, 20 is recharged in both cases.

In a loop branch 70, a check is made to determine whether all rechargeable batteries 19, 20 have been processed.

If this is not the case, the counter reading of the accumulator number is increased by 1 in an incrementation step 61, and the process is continued with the selection step 61 again.

If the result of the check in the loop branch 70 is that the last rechargeable battery 19, 20 has been processed, the method is continued with the cyclically repeated method section 72.

The cyclically repeated method section 72 begins with a readiness indication 73, followed by a reset step 74 of said counter to the first number of the rechargeable batteries 19, 20.

In a selection step 75, the associated rechargeable battery 19, 20 relating to the current counter number is again selected.

Then, the previously selected rechargeable battery 19, 20 is moved to a trickle charging cycle in a step 76.

In a waiting step 77, a pre-specified cycle time for a waiting operation being reached is awaited. This can be pre-specified, for example, by the timing device 90.

An enable request is then transmitted in a request step 78.

The method is stopped until an enable signal is detected in an enable step 79.

A blocking signal for the other rechargeable batteries 19, 20 is then generated in an output step 80 in order to prevent further rechargeable batteries 19, 20 from being able to change over to the maintenance charging cycle.

In a charging step 81, the current rechargeable battery 19, 20 is now charged.

In a discharging step 82, this rechargeable battery 19, 20 is again discharged, with the capacitance of the rechargeable battery 19, 20 being measured.

In a monitoring step 83, a check is made to determine whether the measured capacitance of the rechargeable battery 19, 20 lies below a pre-specified threshold value.

If this is the case, the fault signal which is associated with the respective rechargeable battery 19, 20 is output in an output step 84.

If this is not the case, the rechargeable battery 19, 20 is identified as being functional, and the ability of the current rechargeable battery 19, 20 to function is confirmed in a confirmation step 85.

The rechargeable battery 19, 20 is then fully charged again in a further charging step 86.

In a loop branch 87, a check is made to determine whether the last rechargeable battery 19, 20 of the energy storage unit 10, 11 or 18 or the fitting closing device 4 according to the invention has been reached. If this is the case, the cyclically repeated method section 72 is executed again with the reset step 74.

If the last rechargeable battery 19, 20 has not yet been reached, the counter of the number of the current rechargeable battery 19, 20 is increased in an incrementation step 88, and the blocking signal which is generated in the output step 80 is cleared in a clearing step 89. The loop is then continued with the selection step 75.

The described method according to FIG. 9 can be executed in the associated charging electronics system 22 for each energy storage unit 7, 10, 11, 18 separately or for all charging electronics units 22 of all energy storage units 10, 11, 18 jointly.

Generating blocking signals and carrying out enable requests ensures that two rechargeable batteries are never simultaneously operated in the maintenance charging cycle at any time. The blocking signals, enable signals and/or enable requests can be processed and/or managed by the arbitration device 50 here. The arbitration device 50 can execute an arbitration method when two enable requests or two blocking signals are simultaneously received.

In the case of the fitting closing device 4 with an emergency drive 7, 8, it is proposed to supply power to the emergency drive 7, 8 from at least two energy storage units 10, 11, 18 which are independent of one another and can be operated in a redundant manner, wherein each energy storage unit 10, 11, 18 has a charging electronics system 22 with which rechargeable batteries 19, 20 of the energy storage units 10, 11, 18 can each be operated at least in a maintenance charging cycle and in a trickle charging cycle.

The invention claimed is:

1. A method for keeping ready a fitting closing device (4), wherein the fitting closing device (4) has an input shaft (5) and an output shaft (6), which is coupled to the input shaft (5), and an electrically operable emergency drive (7, 8) with which the output shaft (6) is drivable outside normal operation, wherein the emergency drive (7, 8) is fed from at least two energy storage units (10, 11, 18) which are separate from one another, the energy storage units (10, 11, 18) each have at least one rechargeable battery (19, 20), and the method comprising operating at least one said rechargeable battery (19, 20) in a trickle charging cycle while operating a further said rechargeable battery (19, 20) in a maintenance charging cycle, and, when one said rechargeable battery (19, 20) is operated in the maintenance charging cycle, electronically blocking operation in the maintenance charging cycle for all further said rechargeable batteries (19, 20) of at least one of the associated energy storage unit (10, 11, 18) or the fitting closing device (4).

2. The method as claimed in claim 1, wherein, before one said rechargeable battery (19, 20) changes over to the maintenance charging cycle, checking in an arbitration method to determine whether a further said rechargeable battery (19, 20) is currently being operated in the maintenance charging cycle.

3. The method as claimed in claim 2, wherein, before one said rechargeable battery (19, 20) is operated in the maintenance charging cycle, awaiting at least one of an enable signal or an end of a blocking signal.

4. The method as claimed in claim 3, wherein the rechargeable batteries (19, 20) of one said energy storage unit (10, 11, 18) are successively operated in the maintenance charging cycle.

5. The method as claimed in claim 3, wherein a capacitance of the respective rechargeable battery (19, 20) is measured in the maintenance charging cycle.

6. The method as claimed in claim 5, wherein a fault signal is output when the measured capacitance of the rechargeable battery (19, 20) lies below a threshold value.

7. The method as claimed in claim 2, further comprising generating a blocking signal when one said rechargeable battery (19, 20) is operated in the maintenance charging cycle.

8. The method of claim 3, wherein one said rechargeable battery (19, 20) is fully discharged in the maintenance charging cycle.

9. A fitting closing device (4) comprising an input shaft (5) and an output shaft (6), which is coupled to the input shaft (5), and an electrically operable emergency drive (7, 8) with which the output shaft (6) is driven outside normal operation, the emergency drive (7, 8) is fed from at least two energy storage units (10, 11, 18) of the fitting closing device (4) which are separate from one another, the energy storage units each have at least one rechargeable battery (19, 20), each said energy storage unit (10, 11, 18) has a charging electronics system (22) in each case, each said charging electronics system (22) is operated at least in a maintenance charging cycle and in a trickle charging cycle, and the charging electronics system (22) of one of said energy storage units (10, 11, 18) is coupled to a charging electronics system (22) of a further one of said energy storage units (10, 11, 18) by at least one of a signal or control connection (49) such that the rechargeable batteries (19, 20) cannot be operated in the maintenance charging cycle in both of the energy storage units (10, 11, 18) simultaneously.

10. The fitting closing device (4) as claimed in claim 9, wherein at least one said energy storage unit (10, 11, 18) has more than one rechargeable battery (19, 20) and the associated charging electronics system (22) is designed such that one said rechargeable battery (19, 20) is operated in the maintenance charging cycle and a further said rechargeable battery (19, 20) is operated in the trickle charging cycle at a same time.

11. The fitting closing device (4) as claimed in claim 9, wherein at least one said energy storage unit (10, 11, 18) has more than one said rechargeable battery (19, 20), and the associated charging electronics system (22) is designed to successively carry out the maintenance charging cycles on the rechargeable batteries (19, 20) of the energy storage unit (10, 11, 18).

12. The fitting closing device (4) as claimed in claim 9, further comprises an arbitration device (50) configured to generate a blocking signal when one said rechargeable battery (19, 20) is operated in the maintenance charging cycle.

13. The fitting closing device (4) as claimed in claim 9, wherein each said charging electronics system (22) configured to make an enable request to an arbitration device (50) before an associated rechargeable battery (19, 20) changes over to the maintenance charging cycle.

14. The fitting closing device (4) as claimed in claim 9, further comprises a blocking diode (53) arranged at a supply output (52) of each said energy storage unit (10, 11, 18).

15. The fitting closing device (4) as claimed in claim 9, wherein each said rechargeable battery (19, 20) is selectively electrically connected to a discharge connection (23), to a trickle charge connection (27) and to a maintenance charge connection (25).

16. The fitting closing device as claimed in claim 9, wherein at least one said energy storage unit (10, 11, 18) has more than one said rechargeable battery (19, 20) and the associated charging electronics system (22) is designed such that at most one said rechargeable battery (19, 20) is operated in the maintenance charging cycle at any time.

17. The fitting closing device as claimed in claim 9, further comprising an arbitration device (50) configured to generate an enable signal when none of the rechargeable batteries (19, 20) is operated in the maintenance charging cycle.

18. The fitting closing device as claims in claim 9, wherein at least one said energy storage unit (10, 11, 18) has more than one said rechargeable battery (19, 20), and in each case one blocking diode (55) is arranged at a rechargeable battery output (54) of each said associated rechargeable battery (19, 20).

\* \* \* \* \*